US008726284B2

(12) United States Patent
Liao et al.

(10) Patent No.: US 8,726,284 B2
(45) Date of Patent: May 13, 2014

(54) MANAGING REQUESTS BASED ON REQUEST GROUPS

(75) Inventors: Arthur W. Liao, Cupertino, CA (US); Nicolas F. Barry, San Francisco, CA (US); Anastasios Kasiolas, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 12/813,382

(22) Filed: Jun. 10, 2010

(65) Prior Publication Data

US 2011/0307895 A1  Dec. 15, 2011

(51) Int. Cl.
*G06F 9/46* (2006.01)
(52) U.S. Cl.
USPC .......................................... 718/102
(58) Field of Classification Search
None
See application file for complete search history.

(56) References Cited

U.S. PATENT DOCUMENTS

| | | | |
|---|---|---|---|
| 6,003,083 A * | 12/1999 | Davies et al. | 709/226 |
| 7,500,158 B1 | 3/2009 | Smith et al. | |
| 2003/0046396 A1 * | 3/2003 | Richter et al. | 709/226 |
| 2004/0162901 A1 * | 8/2004 | Mangipudi et al. | 709/225 |
| 2004/0193674 A1 * | 9/2004 | Kurosawa et al. | 709/201 |
| 2007/0271570 A1 | 11/2007 | Brown et al. | |
| 2008/0225710 A1 | 9/2008 | Raja et al. | |
| 2009/0100014 A1 | 4/2009 | Gedik et al. | |
| 2009/0106571 A1 | 4/2009 | Low et al. | |
| 2010/0217866 A1 * | 8/2010 | Nandagopal et al. | 709/226 |

OTHER PUBLICATIONS

Davies, Joe., "New Networking Features in Windows Server 2008 and Windows Vista", Retrieved at << http:// technet.microsoft.com/en-us/library/bb726965.aspx >>, Feb. 15, 2008, pp. 42.

Xinman, Li., "Performance & Monitoring", Retrieved at << http://www.authorstream.com/Presentation/Goldye-17372-1-Performance-Introductions-Monitoring-Agenda-Functions-Network-Management-Why-Delay-Laten-as-Entertainment-ppt-powerpoint/ >>, TEIN2 NOC, CERNET NOC, Sep. 4-8, 2007, pp. 82.

Becker, et al., "Efficiency of Server Task Queueing for Dynamic Load Balancing", Retrieved at << http://eprints.kfupm.edu.sa/36569/1/36569.pdf >>, 1994, pp. 1-12.

* cited by examiner

*Primary Examiner* — Emerson Puente
*Assistant Examiner* — Sisley Kim
(74) *Attorney, Agent, or Firm* — Bryan Webster; Andrew Sanders; Micky Minhas

(57) ABSTRACT

A request management component receives requests to perform an operation. Each of the requests is assigned, based on one or more criteria, to one of multiple different request groups. Based at least in part on execution policies associated with the request groups, determinations are made as to when to submit the requests to one or more recipient. Each of the multiple requests is submitted to one of the recipients when it is determined that the request is to be submitted.

17 Claims, 4 Drawing Sheets

MANAGING REQUESTS BASED ON REQUEST GROUPS

BACKGROUND

Situations oftentimes arise in which one computing component sends a request to another computing component, such as one device sending a request to another device, one program sending a request to another program, and so forth. The recipient of the request may then send the request to yet another computing component. Some components, however, can receive a large number of requests. It can be difficult for components that receive large numbers of requests to manage all the requests they receive while at the same time providing the quality of service that they desire to provide, and further to manage these requests while not overloading other components to which they may send the requests.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request management component receives, from a producer component, a request to perform an operation. The request is assigned, based on one or more criteria, to one of multiple different request groups. Based at least in part on an execution policy associated with the request group to which the request is assigned, a determination is made as to when to invoke a recipient for the request, and the recipient is invoked for the request in accordance with that determination.

BRIEF DESCRIPTION OF THE DRAWINGS

The same numbers are used throughout the drawings to reference like features.

DETAILED DESCRIPTION

Managing requests based on request groups is discussed herein. A request management component operates as an interface between two tiers of components, effectively operating as a middle tier between two tiers of components. The request management component receives requests from one tier and assigns each request to a particular request group based on one or more criteria. An execution policy is associated with each of the request groups, and the execution policy associated with a particular group indicates one or more conditions to be followed in determining when to invoke an appropriate recipient for requests in that particular group. Such a recipient can be a component in the next tier or alternatively another component in the same tier as the request management component. An invocation module of the request management service invokes the appropriate recipients for the multiple request groups in accordance with an execution strategy and the execution policies associated with the request groups.

Figure 1:
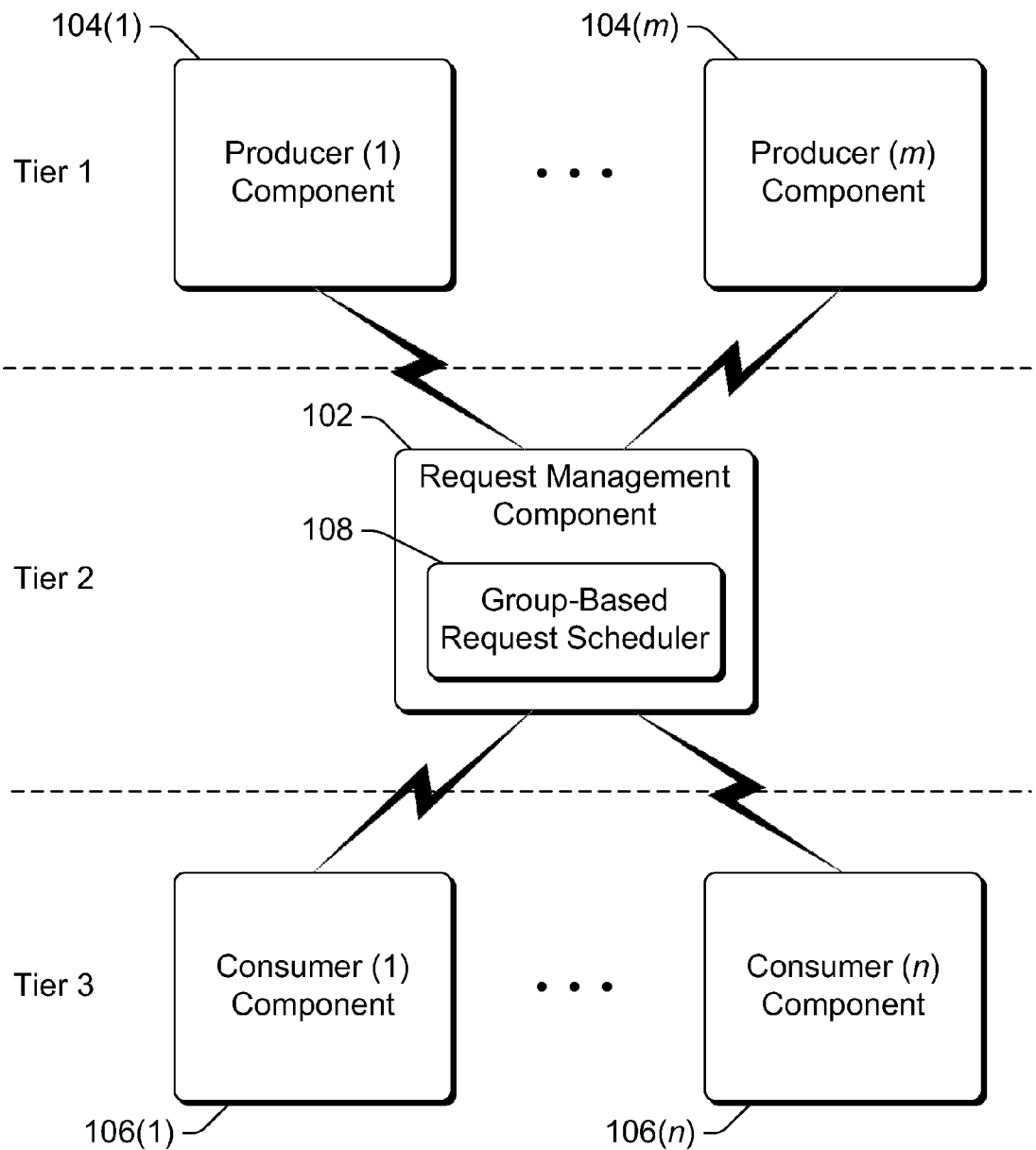
FIG. 1 illustrates an example system implementing the managing requests based on request groups in accordance with one or more embodiments.

FIG. 1 illustrates an example system 100 implementing the managing requests based on request groups in accordance with one or more embodiments. System 100 includes a request management component 102 that can communicate with one or more (m) producer components 104 and with one or more (n) consumer components 106. System 100 is a multi-tiered system in which components in one tier can submit requests to, and receive responses from, components in a next tier. In the example of FIG. 1 three tiers are illustrated, although system 100 can include any number of tiers. Each tier can implement different types of components, such as computers or other devices, networks of computers or other devices, processes, threads, and so forth.

Generally, in system 100 request management component 102 operates as an interface between producer components 104 in one tier and consumer components 106 in a next tier. Request management component 102 can be, for example, a library that can be included in or otherwise used by a variety of different services, devices, modules, and so forth. Resource management component 102 receives requests from producer components 104 and manages invoking consumer components 106 for those requests. Invoking a consumer component 106 for a request can include submitting or otherwise providing the request or an indication of the request to the consumer component. Request management component 102 can control accepting of requests from producer components 104 and can also store different requests for different amounts of time before invoking consumer components 106 for the requests. Request management component 102 is thus also referred to as throttling the requests received from producer components 104 and also throttling the requests being submitted to consumer components 106.

Additionally, although request management component 102 is illustrated as an interface in one tier between two other tiers, alternatively request management component can be included in the first tier or the last tier in the multi-tiered system. For example, request management component 102 can be included in the first tier, throttling the requests being submitted to consumer components 106. By way of another example, request management component 102 can be included in the last tier, throttling the requests received from producer components 104.

Request management component 102 includes a group-based request scheduler 108. Group-based request scheduler 108 uses a variety of different criteria to assign the incoming requests from producer components 104 to one of one or more different groups. Examples of different criteria that scheduler 108 can use in assigning an incoming request to a group are discussed in more detail below. The number of different groups to which scheduler 108 can assign incoming requests is configurable, and can depend on, for example, the various criteria (discussed in more detail below) that a user or administrator of request management component 102 desires to use. The amount of time that a particular request is stored by request management component 102 before being submitted to a consumer component 106 or being rejected varies based at least in part on the group to which the request is assigned, as discussed in more detail below.

Producer component 104 can be any of a variety of different types of components that can submit a request to request management component 102. For example, a producer component 104 can be a computer, a television or set-top box, a cellular or other wireless phone, a network of computers or other devices, a web application, a process running on a computer, a thread running on a computer, a device or service employing another request management component, other types of devices and/or programs, and so forth. Different producer components 104 can be the same or different types of components. It should also be noted that a producer component 104 can operate as a request management component or a consumer component for a previous tier (e.g., a tier 0).

Consumer component 106 can be any of a variety of different types of components that can receive a request from request management component 102. For example, a consumer component 106 can be a computer, a television or set-top box, a cellular or other wireless phone, a network of computers or other devices, a web application, a process running on a computer, a thread running on a computer, a device or service employing another request management component, other types of devices and/or programs, and so forth. Different consumer components 106 can be the same or different types of components. Additionally, consumer components 106 can be the same and/or different types of components than producer components 104. It should also be noted that a consumer component 106 can operate as a request management component or a producer component for a next tier (e.g., a tier 4).

Request management component 102 can communicate with producer components 104 and consumer components 106 in a variety of different manners. The particular manner in which request management component 102 communicates with producer components 104 and consumer components 106 is dependent at least in part on the manner in which components 102, 104, and 106 are implemented. For example, if components 102, 104, and 106 are implemented on different devices, then request management component 102 can communicate with producer components 104 and consumer components 106 via a variety of different networks or other couplings, such as the Internet, a local area network (LAN), a telephone network, an intranet, other public and/or proprietary networks, combinations thereof, other communication links, and so forth. However, if components 102, 104, and 106 are implemented as different programs or processes on the same device, then request management component 102 can communicate with producer components 104 and consumer components 106 via messages, application programming interface (API) requests, or other inter-process communication mechanism supported by an operating system running on the device. Thus, invoking a recipient of a request (or for a request) can be a local invocation (e.g., within a program) or a remote invocation (e.g., over a network, between processes on the same device).

In one or more embodiments, a request can eventually be submitted to a final tier that is typically a service that holds state or other data, and is also referred to herein as a backend service. A consumer component 106 can be a backend service, or alternatively one or more additional tiers can exist between consumer component 106 and the backend service. A backend service can provide one or more of a variety of different functionality, such as one or more of a social networking service, an email service, a messaging service, an image and/or video sharing service, a gaming or other entertainment service, an information or other resource service, and so forth. A backend service 106 maintains various data as part of providing the functionality, such as account information for users, emails sent and/or received by users, images uploaded by users, and so forth. This data can be returned in response to requests received by the backend service.

System 100 can be any multi-tiered system. For example, producer components 104 and consumer components 106 can each be different devices (or groups of devices) coupled to a network such as the Internet. In this example, request management component 102 can be implemented on another device coupled to the same network. By way of another example, producers components 104 and consumer components 106 can each be different programs or processes running on a computer. In this example, request management component 102 can be implemented as another program or process running on the same computer.

Figure 2:
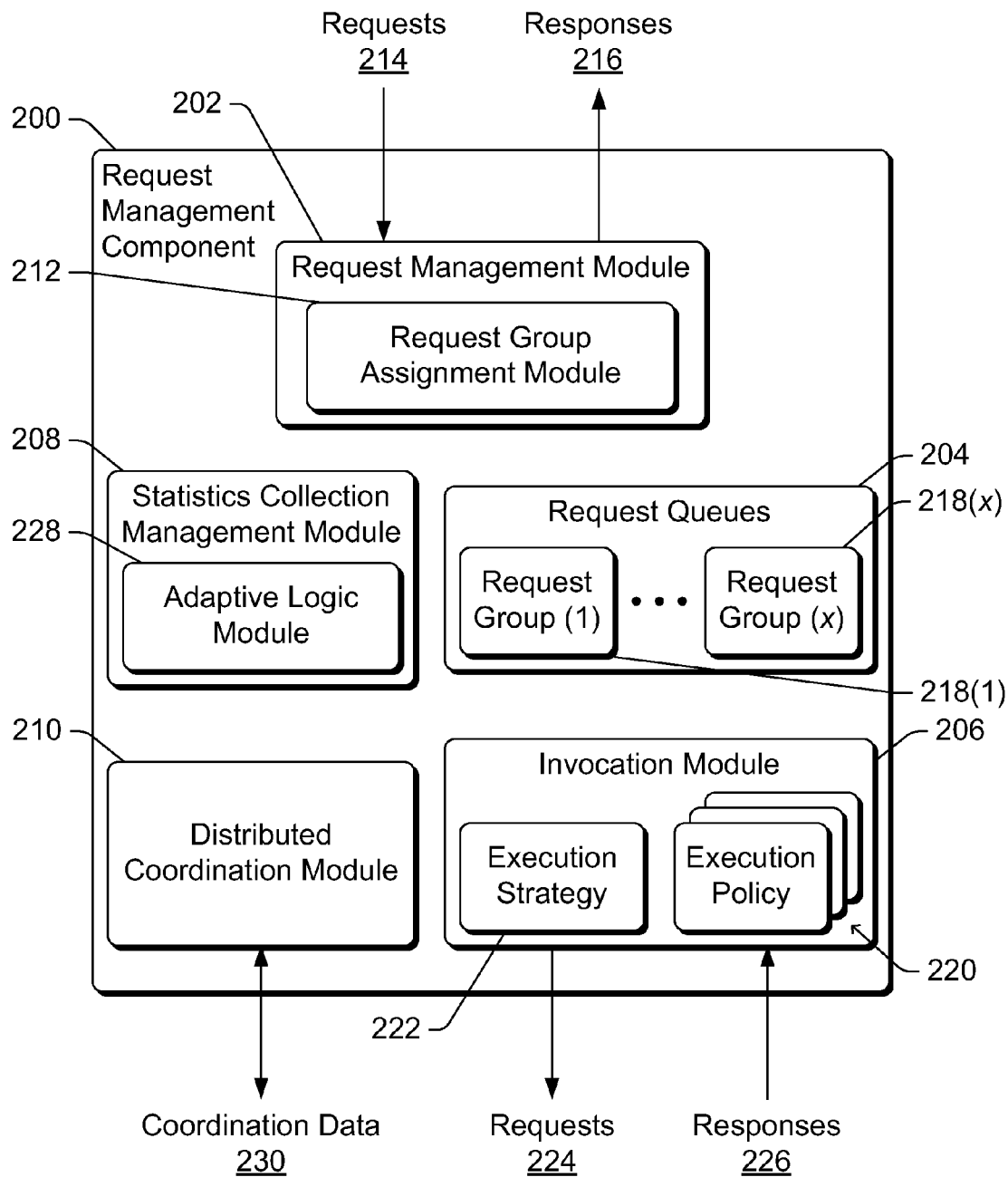
FIG. 2 illustrates an example request management component in accordance with one or more embodiments.

FIG. 2 illustrates an example request management component 200 in accordance with one or more embodiments. Request management component 200 can be, for example, a request management component 102 of FIG. 1. Request management component 200 includes a request management module 202, request queues 204, an invocation module 206, a statistics collection management module 208, and a distributed coordination module 210.

Request management module 202 includes a request group assignment module 212. Request management component 200 receives requests 214 from producer components in a previous tier (e.g., producer components 104 of FIG. 1) and returns responses 216 to the components from which the requests 214 were received. The types of requests 214 that are received by request management module 202 can vary for different implementations, such as based on the particular service that uses request management component 200. For example, the requests 214 can include requests for performing operations (e.g., create, read, update, and delete operations) on data in a backend service.

Requests 214 are received by request management module 202, and request group assignment module 212 assigns each received request to a particular one of one or more request groups based on one or more criteria (discussed in more detail below). The received requests are stored in request queues 204, which stores each request with an indication of the particular one of the multiple request groups 218 to which the request is assigned. If, when a request is received, the request queues are full (e.g., the number of requests in the queue to which the request is assigned is greater than a threshold amount), a failure indication is returned as response 216. The received requests can be stored in queues or other data structures with a separate queue or other structure maintained for each of the different request groups. Alternatively, the received requests can be stored in other manners that allow the request group to which a particular request is assigned to be identified.

Request group assignment module 212 can use a variety of different criteria to determine the request group to which a particular request is to be assigned. Request group assignment module 212 can be configured with the particular criteria to use to assign requests to request groups, can receive the particular criteria to use to assign requests to request groups from another component or module, can receive an administrator or other user input of the particular criteria to use to assign requests to request groups, or can otherwise obtain or determine the particular criteria to use to assign requests to request groups. These criteria can be based on characteristics of the producer component from which the request is received, characteristics of request management component 200, and/or characteristics of the consumer component (e.g., a consumer component 106 of FIG. 1) to be invoked for the request.

Criteria based on characteristics of the producer component from which the request is received include characteristics of the producer component itself and/or characteristics of a user of the producer component. Characteristics of the producer component can be, for example, an identifier of the producer component, a network address (e.g., Internet Protocol (IP) address) of the producer component, one or more programs or applications running on the producer component, a type of application programming interface (API) that the producer component is calling to send request 214, the total number of requests that the producer component is making (e.g., over a particular time duration), any combination of the above, and so forth. Characteristics of the user of the producer component can be, for example, the domain of the user of the producer component, the user name of the user of the producer component, some other identifier of the user, a class or quality of service that the user has purchased or otherwise signed up for, and so forth.

Characteristics of request management component 200 can be, for example, a particular device implementing component 200 that receives the requests 214 (e.g., the IP address to which the request was sent by the customer device), a particular process or thread implementing component 200 that receives the requests 214, and so forth. Characteristics of the consumer component to be invoked for the request include a particular consumer component identified by the request, particular functionality requested by the request (e.g., a particular type of operation being requested), and so forth.

Any number of request groups 218 can be included in request management component 200. In one or more embodiments, the number of request groups 218 that are included in request management component 200 is configurable and can be set by, for example, a user or administrator of component 200 or a device on which component 200 is implemented. For example, the number of request groups 218 can range from one request group for all requests, to one request group for each of the different criteria used by request group assignment module 212. The number of request groups 218 that are included in request management component 200 can also change over time.

Request management module 202 can also reject requests 214 in different situations. For example, if terms of a service agreement with a particular producer component may not be satisfied if a request 214 is accepted (e.g., as determined by adaptive logic module 228 discussed below), then request management module 202 can reject the request 214. By way of another example, if greater than a threshold number of requests 214 have been received from a particular producer component (e.g., with a particular time duration) or the number of requests in the queue to which request 214 is assigned is greater than a threshold amount, then request management module 202 can reject a request 214 from that producer component. Thus, request management module 202 can throttle incoming requests 214, preventing request management module 200 from becoming overloaded.

Invocation module 206 obtains requests from request queues 204 and invokes an appropriate recipient for processing of those requests. The appropriate recipient for processing a request can be a consumer component in a next tier (e.g., a consumer component 106 of FIG. 1). Alternatively the appropriate recipient for processing a request can be another component or module in the same tier as request management component 200 (e.g., another component or module in a service that is implementing request management component 200, another stage in a chain of request queues and invocation modules as discussed in more detail below, etc.). Although discussions herein refer to a consumer component in a next tier being invoked for processing the request, it is to be appreciated that analogously another component or module in the same tier as request management component 200 can be invoked for processing the request.

Invocation module 206 includes multiple execution policies 220 and an execution strategy 222. Each request group 218 has an associated execution policy 220. Invocation module 206 can be configured with execution policies 220 and execution strategy 222, can obtain execution policies 220 and execution strategy 222 from another component or module, can receive an administrator or other user input of the execution policies 220 and execution strategy 222, or can otherwise obtain or determine execution policies 220 and execution strategy 222.

The execution policy 220 associated with a particular request group identifies one or more conditions that invocation module 206 is to take into consideration when determining whether to invoke a recipient for a request from the associated request group. Different execution policies 220 are associated with different request groups, and thus the conditions to be taken into consideration when determining whether to invoke a recipient for a request from a particular request group can vary based on the particular request group to which the request is assigned. One or more execution policies 220 can be partly or fully independent of the request groups (e.g., a global policy as discussed in more detail below). The conditions facilitate throttling the requests assigned to the associated request group, and allow the requests assigned to different request groups to be throttled in different manners. The conditions can be based on characteristics of request management component 200, the request group itself, the consumer component that will be invoked for the request, and so forth. The conditions can be based on physical resources that are shared (e.g., memory, central processing unit (CPU) capacity, bandwidth, etc.), other aspects of the operation of request management module 202 (e.g., numbers of users, numbers of requests per second, etc.), and so forth.

For example, the conditions in a particular execution policy 220 can be an indication of a maximum number of requests (assigned to the request group associated with the particular execution policy 200) that can be executing at any particular time (also referred to as an in-flight limit). A request is considered to be executing or being processed beginning when an appropriate recipient for processing of the request has been invoked, and ending when a response to that request is returned to the producer component as a response 216 (or when a response to the request is received by request management component 200). Thus, different maximum numbers of requests can be executing at any particular time for different request groups.

By way of another example, the conditions in a particular execution policy 220 can be an indication of a maximum amount of a particular resource that requests assigned to the request group associated with the particular execution policy 200 can be consuming at any particular time. Such resources can be, for example, random access memory of component 200, storage space of component 200, processor or CPU capacity of component 200 or the consumer component invoked for requests, network bandwidth (e.g., between the producer component from which the request was received and request management component 200, between request management component 200 and the consumer component invoked for requests, etc.), a maximum number of requests that can be outstanding (e.g., requests for which a particular consumer component has been invoked but for which a response has not yet been received from the consumer component) for a particular consumer component at any particular time, and so forth.

By way of yet another example, the conditions in a particular execution policy 220 can be an indication to "fast fail" requests, rejecting the requests without invoking the next tier for the requests. This allows for quick recovery and eliminating (or at least reducing) lag resulting from a large number of items being queued for the request group.

Execution strategy 222 defines a strategy or technique that is to be used in determining whether an appropriate recipient for requests assigned to particular request groups is to be invoked at any given time. In one or more embodiments, execution strategy 222 defines a weighted round robin scheduling technique that favors particular request groups over other request groups. Alternatively, other techniques can be used to favor particular request groups, such as weighted fair queuing, priority dequeuing, and so forth. The particular request groups that are favored can be identified in different manners, such as based on agreements that an operator of component 200 has with particular customers, classes or qualities of service that particular users have purchased or otherwise signed up for, and so forth.

For example, a particular customer can have an agreement with the operator of component 200 that up to 70% of bandwidth or capacity (e.g., of request management component 200, of a backend service or other consumer component, etc.) is allocated to requests from that particular customer. Requests received from that particular customer are assigned to a particular request group, and execution strategy 222 indicates that up to 70% of the requests (e.g., seven out of every ten) selected from request queues 204 for which a consumer component is to be invoked are selected from that particular request group. By way of another example, particular users may pay for a premium class of service. Requests received from those particular users are assigned to a particular request group, and execution strategy 222 indicates that 80% of the requests (e.g., eight out of every ten) selected from request queues 204 for which a consumer component is to be invoked are selected from that particular request group. By way of yet another example, requests from a particular one or more producer components may tend to overload or swamp request management component 200. Requests received from those particular one or more producer components can be assigned to a particular request group, and execution strategy 222 can indicate that 5% of the requests (e.g., one out of every twenty) selected from request queues 204 for which a consumer component is to be invoked are selected from that particular request group. Furthermore, if greater than a threshold number of requests are already in the request queues 204 for that particular request group, then subsequent requests can be rejected by request management component 200 until the number of requests in the request queues 204 for that particular request group is below the threshold number.

Invocation module 206 selects requests assigned to different request groups 218 and invokes an appropriate recipient for processing of the request. In selecting requests for which a recipient is to be invoked, invocation module 206 adheres to the execution policies 220 associated with the request groups as well as execution strategy 222. Invocation module 206 can also adhere to one or more additional policies that are referred to as global policies and apply for all requests regardless of the request group to which the requests are assigned. Such global policies can include a variety of different conditions, analogous to execution policies 220. For example, a global policy can be an indication of a global maximum number of requests (also referred to as a global in-flight limit) that can be executing at any particular time regardless of the request group to which those requests are assigned. By way of another example, a global policy can be an indication of a maximum number of requests that can be outstanding for a particular consumer component at any particular time.

Requests for which a consumer component is invoked by invocation module 206 are illustrated as requests 224. The particular consumer component that is invoked can be identified in different manners, such as being inherent in the request 214 received from the producer component (e.g., an indication of the consumer component being included in request 214, an API associated with a particular consumer component being invoked to submit request 214 to request management component 200, etc.), being identified by request management component 200 (e.g., based on the content of the request, based on the request group 218 to which the request is assigned, etc.), and so forth.

The consumer component invoked for the request processes the request and returns data and/or information to request management component 200 as a response 226. The processing of a request can refer to a variety of different actions, such as saving or retrieving data, invoking a component in a next tier, and so forth. Request management component 200 receives this data and/or information in response 226, and returns the data and/or information as a response 216 to the producer component from which the request 214 was received. After response 216 has been returned to request management component 200, the request is deemed as being completed and no longer executing or processing by request management component 200. A request can be removed from request queues 204 when it is no longer executing or processing (e.g., when a response 216 has been returned for the request), or alternatively at other times (e.g., when a recipient is invoked for the request).

Thus, it can be seen that request management component 200 controls or manages the invoking of different consumer components for received requests. This control or management can also be viewed as throttling of requests on both an incoming and outgoing basis. Incoming requests are throttled by rejecting requests as discussed above (or alternatively by a first stage of a chain of request queues 204 and invocation modules 206 as discussed in more detail below). Outgoing requests are throttled (e.g., so as not to overload a particular consumer component) because invocation module 206 can take into account how many requests have already been submitted to each consumer component in determining whether to invoke a consumer component for another request.

Request management component 200 also optionally includes statistics collection management module 208. Statistics collection management module 208 collects various statistics regarding the processing of requests by request management component 200 and/or the amount of time taken to respond to requests. For example, statistics collection management module 208 can determine, for each request 214 received by request management component 200, how long completion of the request took (e.g., from the time a request 214 was received by component 200 from a particular producer component to the time a response 216 to that request was returned to that particular producer component). These determinations can then be used by statistics collection management module 208 to determine various statistics regarding the completion of requests by request management component 200, such as an average time to complete requests, a minimum time to complete a request, a maximum time to complete a request, a standard deviation on the time it takes to complete a request, and so forth. These statistics can be determined for each request group 218 individually and/or across multiple request groups 218.

Statistics collection management module 208 also includes an adaptive logic module 228. Adaptive logic module 228 uses the statistics determined by module 208 to adapt or change the invoking of recipients for requests by invocation module 206. This adaptation or changing can be performed, for example, by adaptive logic module 228 modifying execution strategy 222 and/or one or more execution policies 220. Module 228 can adapt or change the invoking of recipients for requests by module 206 for a variety of different reasons, such as to conform to agreements that an operator of component 200 has with particular customers, to avoid overloading or overburdening one or more consumer components, and so forth.

In one or more embodiments, for each agreement that an operator of component 200 has with a particular customer (e.g., regarding quality of service to be provided to that particular customer), the requests for that particular customer are assigned to a particular group as discussed above. Adaptive logic module 228 monitors the quality of service for that particular group (e.g., the average time to complete requests assigned to that particular group) to verify that the terms of the agreement are being satisfied. Module 228 is configured with or otherwise has access to a time (e.g., average time) that is to be taken to complete requests in accordance with the terms of the agreement. If the statistics determined by module 208 indicate that one or more requests 214 that have been received by component 200 but not yet submitted to a recipient will not satisfy the terms of the agreement (e.g., will not be completed within the agreed upon time), then module 208 indicates to reject the request. This indication can be provided to, for example, request management module 202 which returns a response 216 to the producer component from which the rejected request was received that the request is being rejected. This allows the producer component to, for example, retry the request at a later time. Additionally, in situations in which requests 214 are routed to (e.g., load balanced to) different instances of component 200, rejecting the request allows the producer component to resubmit the request and optionally have the request routed to a different instance of component 200 than the instance of component 200 that rejected the request.

Additionally, in one or more embodiments, for each agreement that an operator of component 200 has with a particular customer, the requests for that particular customer are assigned to a particular group as discussed above. Adaptive logic module 228 monitors the quality of service being provided to requests assigned to that particular group to verify that the terms of the agreement are being satisfied (module 228 is configured with or otherwise has access to these terms). The quality of service being provided to requests assigned to a particular group can be determined in different manners, such as the average time to complete requests assigned to that particular group, errors when invoking recipients for requests assigned to that particular group, and so forth. If the statistics determined by module 208 indicate that the quality of service does not satisfy the terms of the agreement, then module 208 lowers the global in-flight limit used by invocation module 206. Alternatively, if the statistics determined by module 208 indicate that resource usage exceeds a threshold (e.g., memory usage by component 200 exceeds a threshold amount, a number of threads being executed by component 200 exceeds a threshold amount, and so forth), then module 208 lowers the global in-flight limit used by invocation module 206. Lowering the global in-flight limit reduces the number of requests that component 200 can be executing at any given time, thereby freeing resources so that the requests that are being executed can be completed more quickly (and/or reducing the resources used to execute such requests).

Similarly, if the statistics determined by module 208 indicate that beginning executing of requests is being delayed due to the global in-flight limit, but that the terms of the agreements the operator has with particular customers are being satisfied and resource usage does not exceed a threshold, then module 208 raises the global in-flight limit used by invocation module 206. Raising the global in-flight limit increases the number of requests that component 200 can be executing at any given time, thereby allowing the requests to be completed more quickly.

Request management component 200 also optionally includes distributed coordination module 210. Request management component 200 can be implemented, for example, using multiple instances of the same software running behind a load balancer that can be implemented in software, firmware, hardware, or combinations thereof. The load balancer can route requests 214 to any of these instances of request management component 200. Thus, subsequent requests 214 from the same producer component can be received and processed by different instances of request management component 200. In such situations, it may be desirable for one or more determinations to be made based on the multiple instances of component 200 as a whole rather than based on individual instances of component 200. For example, each of the multiple instances of component 200 can include a request management module 202, request queues 204, an invocation module 206, a statistics collection management module 208, and a distributed coordination module 210. Determinations, such as whether terms of an agreement with a particular customer are being satisfied, can be made across the multiple instances of component 200 as a whole.

To make such determinations across the multiple instances of component 200 as a whole, the distributed coordination modules 210 in the various instances of component 200 communicate coordination data 230 with one another. The particular coordination data 230 that is communicated can vary based on the determinations being made. For example, the coordination data 230 that is communicated can include various statistics regarding the quality of service being provided by the individual instances of component 200, such as an average time to complete requests, a minimum time to complete a request, a maximum time to complete a request, a standard deviation on the time it takes to complete a request, and so forth. By way of another example, the coordination data 230 that is communicated can include current global in-flight limits being used by the multiple instances of component 200, a number of requests that have been submitted to each of one or more consumer components in a next tier at any given time, a number of requests that are in-flight for each of request groups 218 at any given time, and so forth.

As discussed above, different execution policies 220 are associated with different request groups 218, and execution strategy 222 can cause invocation module 206 to treat different request groups differently when selecting requests for which a recipient is to be invoked. Execution policies 220 and execution strategy 222 can also be changed or adapted by adaptive logic module 228 as discussed above. Furthermore, as coordination data 230 can be communicated among the multiple instances of component 200, execution policies and execution strategy can be adapted or changed on a per request group basis based on information obtained from the various instances of component 200. For example, if a particular customer agreement indicates that 70% of bandwidth or capacity (e.g., of request management component 200, of a backend service or other consumer component, etc.) is to be allocated to requests from that particular customer, and if coordination data 230 indicates that 70% of the bandwidth or capacity is not being allocated to requests from that particular customer, then the execution strategies of one or more instances of request management component 200 can be changed to indicate that 80% or 90% of the requests selected from request queues 204 for submission to a consumer component are selected from the request group to which requests received from that particular customer are assigned.

Additionally, in the example of FIG. 2, one set of request queues 204 and one invocation module 206 are illustrated. Alternatively, multiple sets of request queues 204 and invocation modules 206 can be chained together. A chain can include two or more stages and each stage in the chain includes request queues 204 and an invocation module 206. The first stage in the chain receives requests 214 from producer components, and the last stage in the chain selects requests for which the consumer component is to be invoked. One or more intermediary stages between the first and last stages in the chain each select requests from the previous stage in the chain and invoke the next stage in the chain for the requests.

At each stage in the chain requests are assigned to request groups, and different assignments can be made at different stages of the chain based on different criteria. From one stage, the next stage (or to the consumer component in the case of the last stage) is invoked based on the invocation module (the execution policies and the execution strategy) for that stage. For example, a chain can have three stages. A first stage of the chain can assign requests to request groups based on APIs invoked by the producer components in sending the requests to component 200 and can invoke a second stage for those requests based on particular execution policies and execution strategy. The second stage of the chain can assign requests to request groups based on a class or quality of service that the users of the producer components have purchased or otherwise signed up for and can invoke a third stage for those requests based on different execution policies and execution strategy. The third and last stage of the chain can assign requests to request groups based on IP addresses of the producer components and can invoke the consumer component for those requests based on further different execution policies and execution strategy.

This chaining can also be used to provide throttling of both incoming requests and outgoing requests. For example, a first stage of the chain can assign requests to groups using criteria based on characteristics of the producer component from which the request is received. The request management module can reject a request that would be assigned to a particular group if a threshold number of requests are already in the queue for that group. This first stage provides throttling of incoming requests (e.g., the second stage of the chain is invoked for requests based on the execution policies and execution strategy associated with the request groups in the first stage). The second stage of the chain can assign requests to groups using criteria based on characteristics of the consumer component to be invoked for the request. This second stage provides throttling of outgoing requests (e.g., the consumer component is invoked for requests based on the execution policies and execution strategy associated with the request groups in the second stage).

Figure 3:
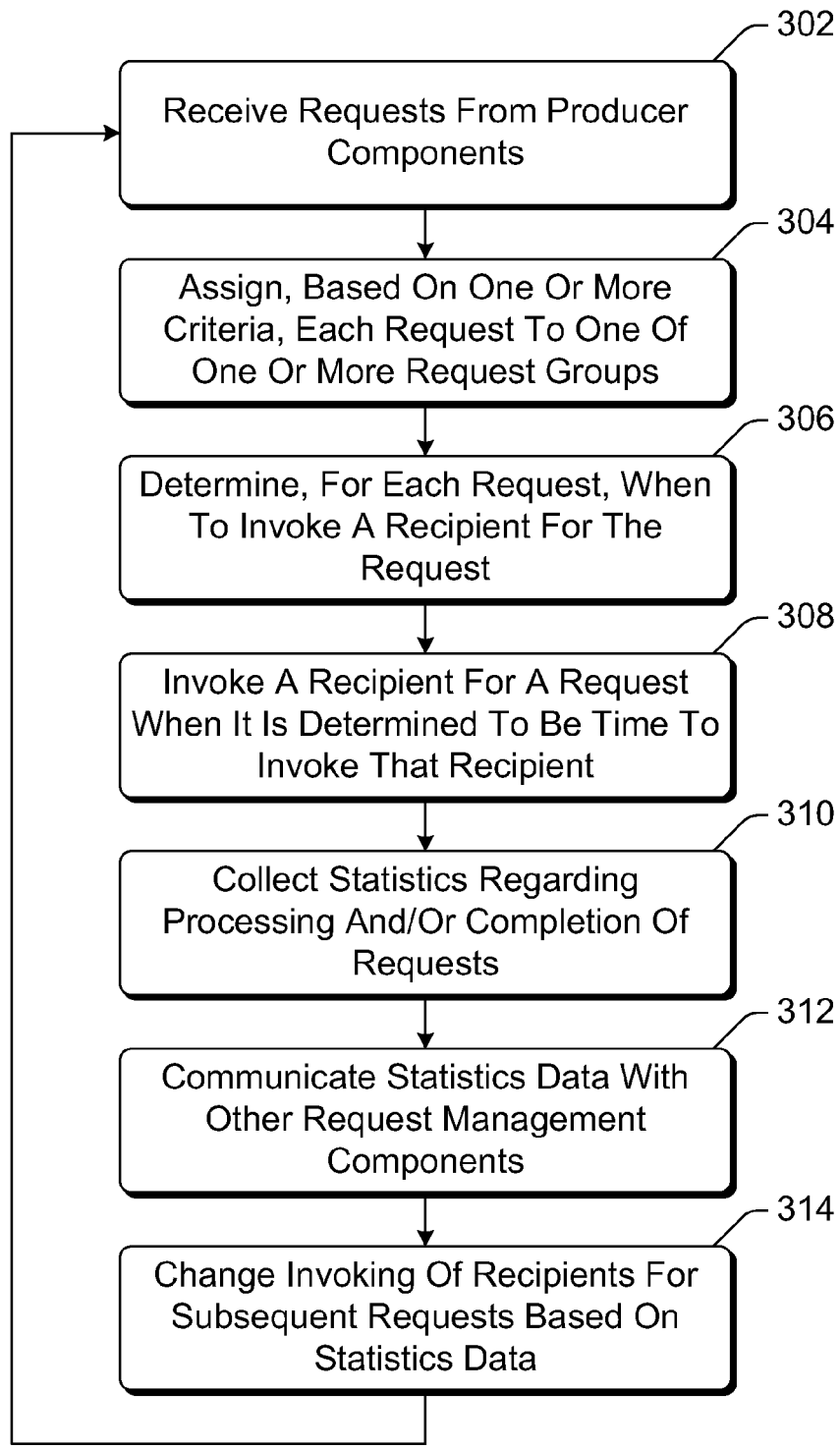
FIG. 3 is a flowchart illustrating an example process for managing requests based on request groups in accordance with one or more embodiments.

FIG. 3 is a flowchart illustrating an example process 300 for managing requests based on request groups in accordance with one or more embodiments. Process 300 is carried out by a request management component, such as request management component 102 of FIG. 1 or a request management component 200 of FIG. 2, and can be implemented in software, firmware, hardware, or combinations thereof. Process 300 is shown as a set of acts and is not limited to the order shown for performing the operations of the various acts. Process 300 is an example process for managing requests based on request groups; additional discussions of managing requests based on request groups are included herein with reference to different figures.

In process 300, requests are received from producer components (act 302). Multiple requests can be received from each of one or more producer components as discussed above.

Each of the received requests is assigned to one of one or more request groups based on one or more criteria (act 304). A variety of different criteria can be used to assign a request to a request group as discussed above. The number of different request groups to which received requests can be assigned is configurable as discussed above.

For each request, a determination is made as to when to invoke a recipient for the request (act 306). This determination is made based at least in part on an execution policy and an execution strategy as discussed above.

A recipient for a request is invoked when it is determined in act 306 to be time to invoke a recipient for that request (act 308). Invoking the recipient can include submitting the request to or otherwise providing the request or an indication of the request to the recipient. The recipient for the request can be a variety of different recipients, such as one of multiple different consumer components, a next stage of a chain of request queues and invocation modules, another component in a same tier as the request management component carrying out process 300, and so forth.

Statistics regarding the processing and/or completion of requests are collected (act 310). A variety of different statistics can be collected as discussed above.

Additionally, statistics data is communicated with other request management components (act 312). This communication of statistics data includes sending statistics data collected in act 310 to other request management components as well as receiving, from the other request management components, statistics data collected by those other request management components as discussed above. This communication of statistics data can be done as, for example a background or other lower priority operation. Thus, the communication of statistics data has a small (if any) impact on the performance of the request management components.

The invoking of recipients for subsequent requests is adapted or changed based on the statistics data (act 314). This statistics data includes the collected statistics in act 310 as well as statistics data received from other request management components in act 312. This adaptation or change in the invoking of recipients for subsequent requests can be performed in a variety of different manners as discussed above. Process 300 then returns to act 302 where additional requests are received from producer components 302.

In one or more embodiments, one or more of the acts in process 300 are not performed. For example, acts 310, 312, and 314 may not be performed in one or more embodiments.

Figure 4:
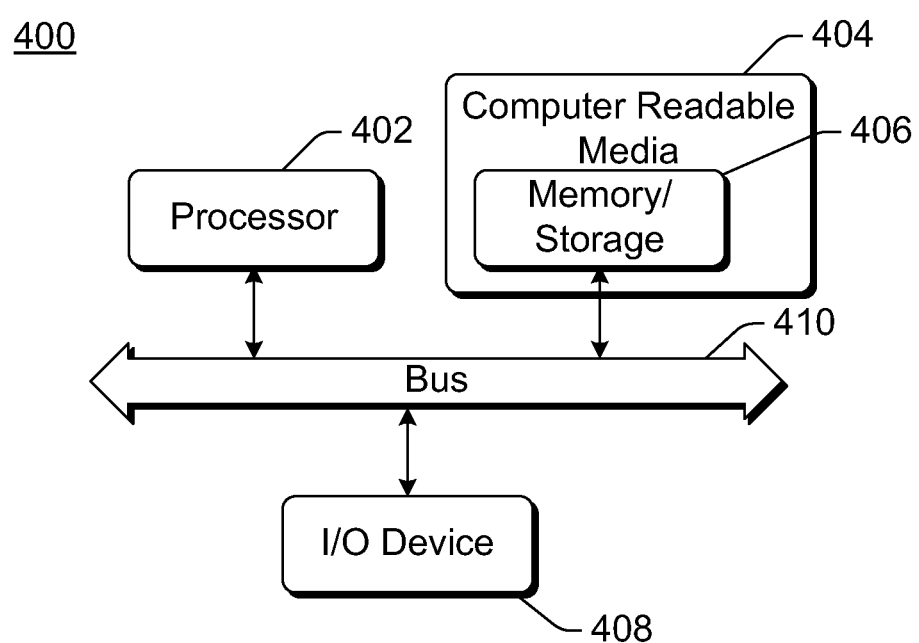
FIG. 4 illustrates an example computing device that can be configured to implement various aspects of the managing requests based on request groups in accordance with one or more embodiments.

FIG. 4 illustrates an example computing device 400 that can be configured to implement various aspects of the managing requests based on request groups in accordance with one or more embodiments. Computing device 400 can implement a service or other program that includes or uses a request management component 102 of FIG. 1 or a request management component 200 of FIG. 2. Computing device 400 can also be or implement, for example, a producer component 104 of FIG. 1, a request management component 102 of FIG. 1, a consumer component 106 of FIG. 1, or a request management component 200 of FIG. 2.

Computing device 400 includes one or more processors or processing units 402, one or more computer readable media 404 which can include one or more memory and/or storage components 406, one or more input/output (I/O) devices 408, and a bus 410 that allows the various components and devices to communicate with one another. Computer readable media 404 and/or one or more I/O devices 408 can be included as part of, or alternatively may be coupled to, computing device 400. Bus 410 represents one or more of several types of bus structures, including a memory bus or memory controller, a peripheral bus, an accelerated graphics port, a processor or local bus, and so forth using a variety of different bus architectures. Bus 410 can include wired and/or wireless buses.

Memory/storage component 406 represents one or more computer storage media. Component 406 can include volatile media (such as random access memory (RAM)) and/or non-volatile media (such as read only memory (ROM), Flash memory, optical disks, magnetic disks, and so forth). Component 406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 402. It is to be appreciated that different instructions can be stored in different components of computing device 400, such as in a processing unit 402, in various cache memories of a processing unit 402, in other cache memories of device 400 (not shown), on other computer readable media, and so forth. Additionally, it is to be appreciated that the location where instructions are stored in computing device 400 can change over time.

One or more input/output devices 408 allow a user to enter commands and information to computing device 400, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 4. The features of the managing requests based on request groups techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method in a request management component in one tier of a multi-tier system, the method comprising:
    chaining together a plurality of stages, each stage comprising a request queue and an invocation module, the request queue comprising multiple request groups, different assignments of multiple requests being made to each stage based on different criteria;
    receiving at a first stage, from a producer component in a previous tier of the multi-tier system, a request, of the multiple requests, to perform an operation on a backend service in a next tier of the multi-tier system;
    assigning at the first stage, based on one or more criteria, the request to one of one or more of multiple different request groups, the one or more criteria including characteristics of the producer component;
    selecting, at one or more successive stages after the first stage, requests from a previous stage in the chain based at least in part on one or more additional criteria comprising a quality of service associated with a user of the producer component;
    assigning selected requests to a respective request group in a successive stage of the one or more successive stages;
    invoking, at the successive stage, a next stage in the chain for the selected request;
    determining, at a final stage, based at least in part on both an execution policy associated with the one of multiple different request groups to which the request is assigned and an execution strategy, when to invoke the backend service for the request, the execution strategy having been changed from previous execution strategies used by the request management component based on statistics collected regarding execution of previous requests received from the producer component by multiple different instances of the request management component; and invoking, if quality of service terms for the producer component will be met, the backend service for the request, when it is determined that the backend service for the request is to be invoked, and otherwise rejecting the request, rejecting the request allowing the producer component to resubmit the request and have the request routed to one of the multiple different instances of the request management component.

2. A method as recited in claim 1, wherein invoking the backend service for the request comprises submitting the request to a consumer component in a next tier.

3. A method as recited in claim 1, further comprising:
receiving, from the backend service, a response to the request; and returning the response received from the backend service to the producer component from which the request was received.

4. A method as recited in claim 1, further comprising rejecting at least one of the multiple requests based on additional criteria.

5. A method as recited in claim 4, wherein the additional criteria comprises:
a global maximum number of requests that can be executing at any particular time regardless of the request groups to which the multiple requests are assigned, or for each of the multiple requests a maximum number of requests assigned to the associated request group that can be executing at any particular time.

6. A method as recited in claim 1, wherein the execution strategy is a weighted round robin scheduling technique.

7. A method as recited in claim 1, wherein:
each of the multiple instances of the request management component includes a distributed coordination module via which data regarding the statistics can be communicated with other instances of the request management component; and the method further comprising:
changing, based on the statistics collected by the one or more instances of the request management component, one or both of the execution strategy and one or more of the multiple execution policies.

8. A method as recited in claim 7, wherein the collecting comprises collecting statistics regarding the processing of requests of the multiple requests by a single instance of the request management component, and wherein the changing comprises changing, based on the statistics collected by the single instance of the request management component, one or both of the execution strategy and one or more of the multiple execution policies.

9. A method as recited in claim 1, wherein the first stage assigns each of the multiple incoming requests to request groups based on at least one characteristic of the component producing the request, and a second stage assigns requests to request groups based on at least one characteristic of the consumer component.

10. One or more computer storage media having stored thereon multiple instructions that implement a request management component in one tier of a multi-tier system by, when executed by one or more processors of a computing device, causing the one or more processors to:
chain together a plurality of stages, each stage comprising a request queue and an invocation module, the request queue comprising multiple request groups, different assignments being made to each stage based on different criteria;

receive at a first stage, from a producer component in a previous tier of the multi-tier system, a request of the multiple requests to perform an operation on a backend service in a next tier of the multi-tier system;

assign at the first stage, based on one or more criteria, the request to one of one or more of multiple different request groups the one or more criteria including characteristics of the producer component;

select, at one or more successive stages after the first stage, requests from a previous stage in the chain based at least in part on one or more additional criteria comprising a quality of service associated with a user of the producer component;

assign selected requests to a respective request group in a successive stage of the one or more successive stages;

invoke, at the successive stage, a next stage in the chain for the selected request;

determine, at a final stage, based at least in part on an execution policy associated with the one of multiple different request groups to which the request is assigned and an execution strategy, when to invoke the backend service for the request, the execution strategy having been changed from previous execution strategies used by the request management component based on statistics collected regarding execution of previous requests received from the producer component by multiple different instances of the request management component; and invoke, if quality of service terms for the producer component will be met, the backend service for the request, when it is determined that the backend service for the request is to be invoked, and otherwise rejecting the request, rejecting the request allowing the producer component to resubmit the request and have the request routed to one of the multiple different instances of the request management component.

11. One or more computer storage media as recited in claim 10, wherein the request management component is in one tier of the multi-tier system, and wherein the recipient comprises a consumer component in a next tier of the multi-tier system.

12. One or more computer storage media as recited in claim 10, wherein the one or more criteria comprise characteristics of the request management component.

13. One or more computer storage media as recited in claim 10, wherein the one or more criteria comprise characteristics of the recipient.

14. One or more computer storage media as recited in claim 10, wherein to determine when to submit the request is to further determine, based at least in part on an execution strategy that is a weighted round robin scheduling technique, when to submit the request to the recipient.

15. One or more computer storage media as recited in claim 10, wherein:
each of the multiple instances of the request management component includes a distributed coordination module via which data regarding the statistics can be communicated with other instances of the request management component; and the multiple instructions further cause the one or more processors to:
change, based on the statistics collected by the one or more instances of the request management component, one or both of an execution strategy and the execution policy.

16. One or more computer storage media as recited in claim 15, wherein to collect the statistics is to collect statistics regarding the processing of previous requests received by a single instance of the request management component, and wherein to change one or both of the execution strategy and the execution policy is to change, based on the statistics collected by the single instance of the request management component, one or both of the execution strategy and the execution policy.

17. A system comprising:
one or more processors; and
memory, coupled to the one or more processors, comprising instructions executable to implement a request management component in one tier of a multi-tier system, the request management component configured to implement a method comprising:
chaining together a plurality of stages, each stage comprising a request queue and an invocation module, the request queue comprising multiple request groups, different assignments being made to each stage based on different criteria;
receiving at a first stage, from a producer component in a previous tier of the multi-tier system, a request of the multiple requests to perform an operation on a backend service in a next tier of the multi-tier system;
assigning at the first stage, based on one or more criteria, the request to one of one or more multiple different request groups, the one or more criteria including characteristics of the producer component;
selecting, at one or more successive stages after the first stage, requests from a previous stage in the chain based at least in part on one or more additional criteria, the one or more additional criteria comprising a quality of service associated with a user of the producer component;
assigning selected requests to a respective request group in a successive stage of the one or more successive stages;
invoking, at the successive stage, a next stage in the chain for the selected request;
determining, at a final stage, based at least in part on both an execution policy associated with the one of multiple different request groups to which the request is assigned and an execution strategy, when to invoke the backend service for the request, the execution strategy having been changed from previous execution strategies used by the request management component based on statistics collected regarding execution of previous requests received from the producer component by multiple different instances of the request management component; and
invoking, if quality of service terms for the producer component will be met, the backend service for the request when it is determined that the backend service for the request is to be invoked, and otherwise rejecting the request, rejecting the request allowing the producer component to resubmit the request and have the request routed to one of the multiple different instances of the request management component.

* * * * *